A. EKLUND.
BRACELET.
APPLICATION FILED MAY 20, 1912.

1,047,623.

Patented Dec. 17, 1912.

Witnesses
Ada E. Hagerty.
Elsa B. Dana.

Inventor
Alexander Eklund
by Joseph A. Miller
Attorney

COLUMBIA PLANOGRAPH CO., WASHINGTON, D. C.

UNITED STATES PATENT OFFICE.

ALEXANDER EKLUND, OF ATTLEBORO, MASSACHUSETTS, ASSIGNOR TO J. F. STURDY'S SONS CO., OF ATTLEBORO FALLS, MASSACHUSETTS, A CORPORATION OF RHODE ISLAND.

BRACELET.

1,047,623.  Specification of Letters Patent.  Patented Dec. 17, 1912.

Application filed May 20, 1912. Serial No. 698,359.

*To all whom it may concern:*

Be it known that I, ALEXANDER EKLUND, a citizen of the United States, residing at Attleboro, in the county of Bristol and State of Massachusetts, have invented a new and useful Improvement in Bracelets, of which the following is a specification.

This invention relates to certain new and useful improvements in bracelets, and the object of the invention is to provide improved and novel means for locking the free ends of the two hinged sections.

Further the invention aims to provide a locking device in which the catch is permitted to center itself in locking.

Figure 1:
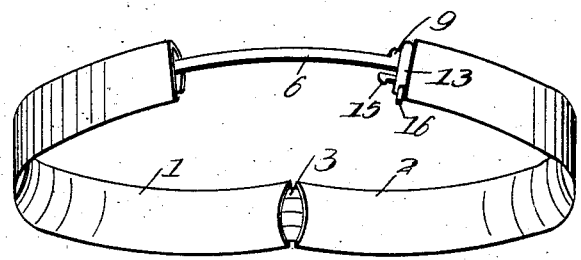
Figure 2:
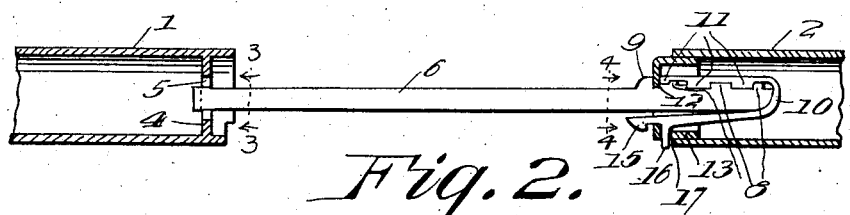
Figure 3:
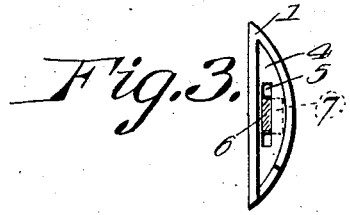
Figure 4:
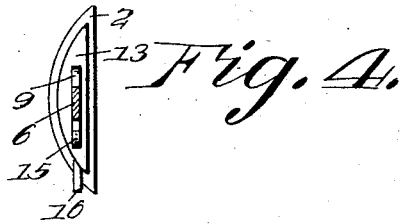
Figure 5:
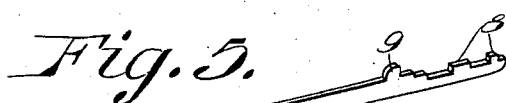
Figure 6:
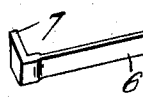
Figure 7:
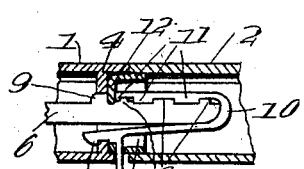

In the drawings: Figure 1 is a perspective view of the bracelet in open position. Fig. 2 is a fragmentary sectional view. Fig. 3 is a section on line 3—3 of Fig. 2. Fig. 4 is a section on line 4—4 of Fig. 2. Fig. 5 is a perspective view of the guard. Fig. 6 is a similar view of the catch, and Fig. 7 is a fragmentary sectional view showing the catch in locked position.

The bracelet is formed of two sections, 1 and 2 connected by a hinge 3. On the interior of the free end of section 1 is a transverse keeper plate 4 that is formed with an elongated rectangular slot 5 to permit the end of the guard 6 that has the right angular stop 7 to have a relative sidewise movement, for which purpose the slot 5 is of greater length than the width of the guard 6. The opposite end of the guard 6 is formed with a pair of teeth 8 which are spaced apart, and an abutment 9 which has its outer side rounded. The catch member 10 is of substantially U-shape and is formed with teeth 11 which project inwardly from the inner face of one leg of the catch, the teeth 11 being spaced apart and intermeshing with the teeth 8 of the guard, the catch receiving the guard in the space between the legs of the U. The free end of the leg of the U that has the teeth 11 is spaced from the rear side of abutment 9 of the guard 6 to receive in said space the end wall 12 of a housing 13, which housing is rigidly secured on the interior of the free end of section 2 and which when the parts are in the locked position depicted in Fig. 7 of the drawings, abuts the plate or keeper 4 of the section 1. The catch member 10 is formed of spring material in which the legs thereof have a tendency at all times to move away from one another. The leg 14 of the catch member is formed with a catch proper 15 at its free end and with an arm 16 that projects through an opening 17 provided therefor in the housing 13, the catch proper 15 being spaced from the adjacent side of the guard 6 when the bracelet is open. The catch member 10 is held against any sliding movement with respect to the section 2 by virtue of its end 16 engaging through the opening 17 of the housing 13.

In operation it will be seen that since the guard 6 is capable of having sidewise movement with respect to the keeper 4 that when the parts are moved to locked position the abutment 9 and the catch proper 15 will simultaneously engage the end walls of the keeper formed by the slot 5, which results in perfect centering of the latch during the locking movements of the same.

Having thus described my invention, I claim as new and desire to secure by Letters Patent:—

1. In a bracelet composed of a pair of sections hinged at one end, a keeper formed of a plate that has an elongated slot therein, a guard of less width than the length of said slot received in the latter and having a stop at one end that engages on the rear side of the keeper, the opposite end of the guard having an abutment and spaced teeth, a U-shaped catch member receiving the last mentioned end of the guard in the space between its legs, one of the legs having teeth which mesh with the teeth of the guard, the free end of said leg being spaced from the rear side of abutment, a housing in the free end of the other section having an end wall which engages in the space between the rear side of the abutment and the free end of said leg, said housing having an opening, the other leg of the catch having a catch proper and an arm which extends through the opening of the housing.

2. In a bracelet composed of a pair of sections hinged together at one end, a guard slidably connecting the opposite ends of the sections, and a catch member of U-shape receiving one end of the guard in the space between the legs of the U.

3. In a bracelet composed of a pair of sections hinged together at one end, a guard having one end connected to the opposite end of one of the sections and having its other end slidably connected to the opposite end of the other section, the first named end of the guard having teeth, and a U-shaped catch member secured to the guard and receiving the guard between its legs and having teeth which intermesh with the teeth of the guard.

4. In a bracelet composed of a pair of sections hingedly connected at one end, a slotted keeper secured to the free end of one of the sections, a guard having one end received in said slot and having a stop for engagement with the keeper, an abutment on the opposite end of the guard, a housing secured to the free end of the other section and having an end wall which engages said abutment, and a catch member which engages over opposite sides of the guard and which has one end engaging the rear side of said housing end wall, the other end of the catch member extending through said housing end wall.

5. In combination with a pair of hingedly connected bracelet sections, a slotted keeper secured to the free end of one of said sections, a housing secured to the free end of the other section, a guard having its ends extending respectively through the slot of the keeper and through the end wall of said housing, and a U-shaped catch member which receives the last named end of the guard in the space between the legs of the U and is connected thereto, the catch proper of the catch member extending through the end wall of the housing.

6. In combination with a pair of hingedly connected bracelet sections, a slotted keeper secured to the free end of one of said sections, a housing secured to the free end of the other section, a guard having its ends extending respectively through the slot of the keeper and through the end wall of said housing, an abutment on one side of the guard arranged adjacent to said end wall of the housing, and a catch member connected to the guard which has its catch proper disposed on the opposite side of the guard and extending through the end wall of the housing.

In testimony whereof I have signed my name to this specification in the presence of two subscribing witnesses.

ALEXANDER EKLUND.

Witnesses:
 ADA E. HAGERTY,
 J. A. MILLER.

---

Copies of this patent may be obtained for five cents each, by addressing the "Commissioner of Patents, Washington, D. C."